United States Patent [19]

Shaparew

[11] Patent Number: 4,599,757
[45] Date of Patent: Jul. 15, 1986

[54] POLLEN TRAP

[76] Inventor: Vladimir Shaparew, 3371 Trafalgar Rd., R.R. #1, Oakville, Ontario, Canada, L6J 4Z2

[21] Appl. No.: 699,802

[22] Filed: Feb. 8, 1985

[30] Foreign Application Priority Data

Feb. 27, 1984 [CA] Canada .................................. 448352

[51] Int. Cl.⁴ ............................................ A01K 47/06
[52] U.S. Cl. ......................................................... 6/4 R
[58] Field of Search ......................................... 6/1, 4 R

[56] References Cited

U.S. PATENT DOCUMENTS

| 87,003 | 2/1869 | Praul | 6/1 |
| 2,435,951 | 2/1948 | Antles | 6/4 R |
| 3,995,338 | 12/1976 | Kauffeld | 6/4 R |
| 4,322,861 | 4/1982 | Healy | 6/4 R |
| 4,337,541 | 7/1982 | Brown | 6/4 R |
| 4,351,074 | 9/1982 | Robson | 6/4 R X |
| 4,367,563 | 1/1983 | Ferguson | 6/4 R |
| 4,455,699 | 6/1984 | Brown | 6/4 R |

Primary Examiner—Robert P. Swiatek
Attorney, Agent, or Firm—Donald E. Hewson

[57] ABSTRACT

A pollen trap for a beehive is disclosed. The trap includes an open frame which contains a pollen stripper for a conventional beehive. Mounted in the frame are two screens, having two meshes that are fine enough to dislodge granules of pollen from the bees as they crawl through. The pollen drops down through a bee-tight screen into a removable pollen basket. The invention provides an all-enveloping bee-tight tunnel or sheath for the pollen basket, the sides of the tunnel being spaced from the side walls of the frame to provide bee-access space. This construction permits the pollen basket area to occupy virtually all the area of the hive to promote good ventilation to dry neater and pollen.

7 Claims, 3 Drawing Figures

POLLEN TRAP

FIELD OF THE INVENTION

This invention relates to a pollen trap for beehives.

BACKGROUND OF THE INVENTION AND THE PRIOR ART

There is shown in, for example, U.S. Pat. No. 4,337,541, issued July 6th, 1983 to BROWN, (FIG. 16 being the most relevant) a typical conventional arrangement for collecting pollen. This arrangement comprises meshes of varying fineness, disposed in spaced horizontal planes one above the other.

The lowermost or first mesh is the finest, the space between adjacent wires being small enough to prevent granules of pollen from falling through, yet large enough to let air circulate over the pollen to dry it.

The next mesh up has a slightly coarser pitch. The space now between adjacent wires allows pollen granules to fall through-(onto the finer mesh below) but is small enough to keep bees from passing through the mesh.

The upper mesh or, more usually, two meshes have the coarsest pitch and comprise a pollen stripper. The space between adjacent wires now is large enough to allow the bees to crawl through, yet tight enough to knock granules of pollen from their legs when they do so. The granules drop down through the second mesh and come to rest on the first mesh. The two pollen stripping meshes have been found to knock pollen off the bees legs more efficiently than just one.

It is arranged that the first mesh comprises the bottom of pollen basket, or drawer, which the beekeeper can pull open when he wants to remove the collected pollen.

Other examples of such pollen traps are shown in U.S. Pat. Nos. 4,367,563 issued Jan. 11, 1983, FERGUSON; 4,351,074 issued Sept. 28, 1982, ROBSON; 4,322,861 issued Apr. 6, 1982, HEALY; and 3,995,338 issued Dec. 7, 1976, KAUFFELD.

All of these prior teachings have failed to recognize the critical importance of adequate ventilation. If air circulation is reduced, then honey production falls, and in addition the pollen granules do not dry so quickly. A badly ventilated hive will provide reduced pollination of crops, including fruit trees etc.

Another factor not given attention in the prior art is the need to keep rainwater out of the pollen basket. The construction has been such that windblown rain dripped into the pollen basket.

Another factor still is that the bees should not be restricted in their access into the hive. Once through the entrance, they should be given ample room to move. Placing a pollen trap in a beehive is quite a disruption from normal, and the restrictions within the pollen trap must be minimized.

It is recognized as important that the pollen trap should be efficient; that is, that as much as possible of the pollen be stripped from the bees. It is true that the hive needs a stock of pollen to produce new bees in the summer, and to ensure survival through the winter. Beekeepers in the past have therefore felt that one should not take too much pollen from the hive, because the bees would then need to dip into the hive's stocks. However, in the past it has not been recognized that the bees can quickly make up a depleted stock of pollen during the season, without any detriment at all to the smooth functioning of the hive. Hence, an efficient pollen trap can be more economical in use for the following reason; such a trap stays on one hive for, say, six weeks, and is then removed. Since the pollen season is around twelve weeks long (June, July and August) it will be noted that only one trap is needed to collect all the pollen that can be taken from two hives, if neither is to be dangerously de-stocked of pollen. It has not been recognized, again, that such efficiency of pollen collection stems from the design of the trap, which should interfere as little as possible with the ventilation of the hive and the movement of the bees.

As has been mentioned above, it has not been recognized just how important good ventilation and unrestricted access are. This fact is evidenced by the design of the prior art pollen traps, where the size of the area covered by the meshes i.e., the area exposed for ventilation, is small in relation to the overall area of the hive. In previous designs, the path which the bees traverse in passing through the pollen trap has been circuitous and restricted. The known pollen traps have all had restricted access and ventilation to such an extent that the efficient operation of the hive must inevitably have suffered.

The invention is aimed at making it possible for the area of the pollen basket to be the very largest it can be, within the dimensions of the hive. The invention is also aimed at allowing the bees to move through the trap in as unrestrained a manner as possible, not only to avoid disturbing the bees, but also to ensure that the pollen is distributed evenly in the basket. If the bees were to be congested by the layout of the trap, then the pollen would collect in a heap at one point in the basket, and would not be evenly distributed. The even distribution over the largest area ensures the best drying effect, and the least interference with hive ventilation, and also it means that the pollen basket need be emptied only once in several days, rather than every day.

BRIEF DESCRIPTION OF THE INVENTION

In the invention, the bees enter from below the pollen basket in which the pollen is collected. They make their way to the area above the basket through spaces provided at the sides of the drawer. This has two benefits, as compared with locating the access spaces at the front or back of the drawer, as was done in the prior art. First, the length of the sides of the drawer exceeds that of the width of the drawer, so that the access area is larger; the combined length being about 90 cm. Second, the drawer itself, and hence the areas covered by the mesh (and open for ventilation) can extend the full front-to-back dimension of the hive.

Moreover, the construction of the pollen trap, when the spaces are at the sides of the drawer, is very simple, as compared with the prior art. The prior art traps have needed many sub-frameworks to support the meshes, which made the traps heavy and cumbersome.

It is preferable that the drawer be in a sheath, so that the bees cannot come in contact with the drawer. This is for two reasons: first so that the drawer may be opened and closed without hurting the bees, and second so that the bees cannot propolise the drawer to its guides or runners which would interfere with the removal of the pollen basket. Having the bee-access at the sides of the pollen basket makes for a very easy manner of constructing the sheath, as will become clear presently.

DETAILED DESCRIPTION OF AN EMBODIMENT OF THE INVENTION

The invention will now be further described with reference to the accompanying drawings in which.

Figure 1:
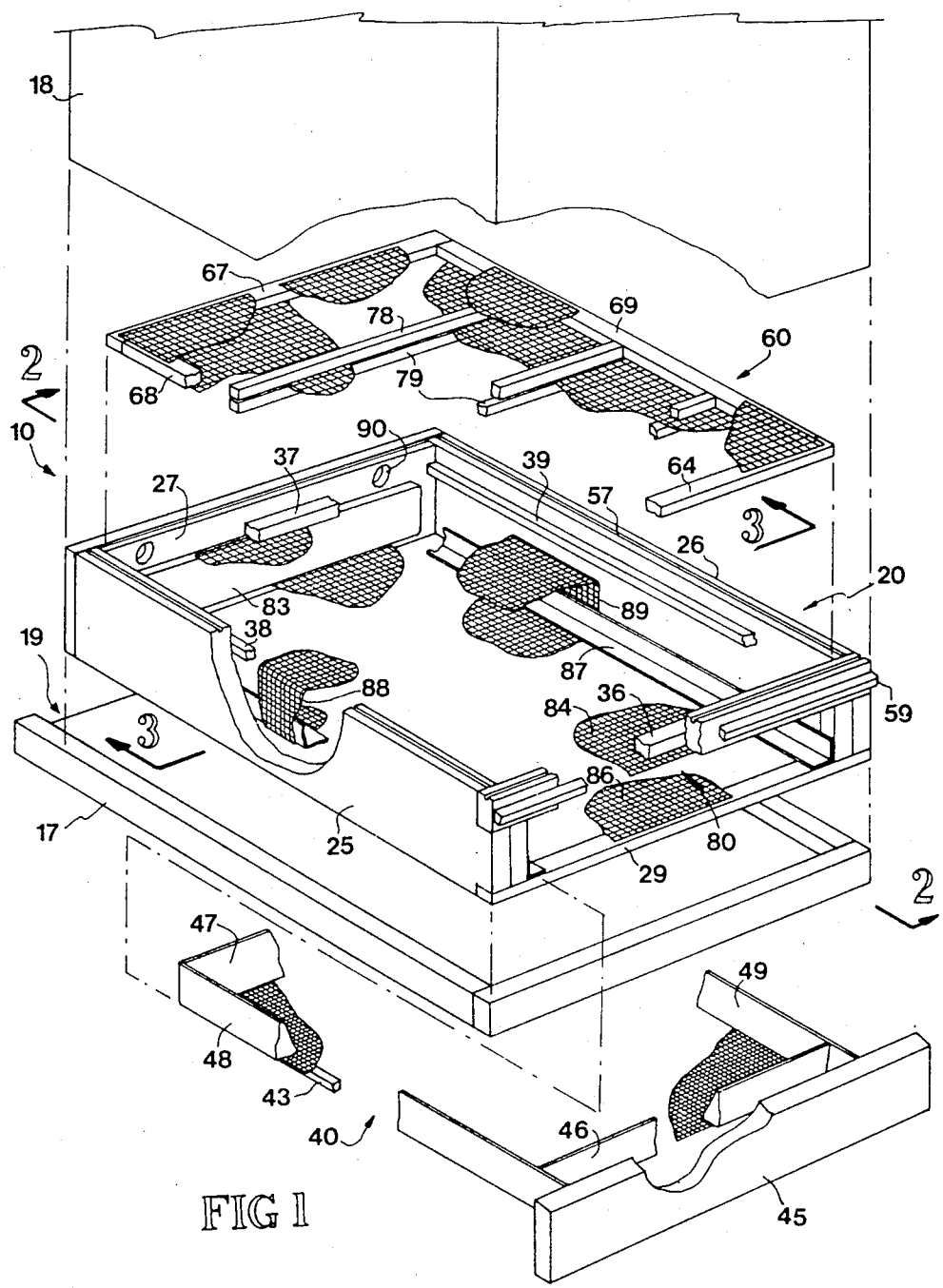
FIG. 1 is a view of a pollen trap, partly cut away.
Figure 2:
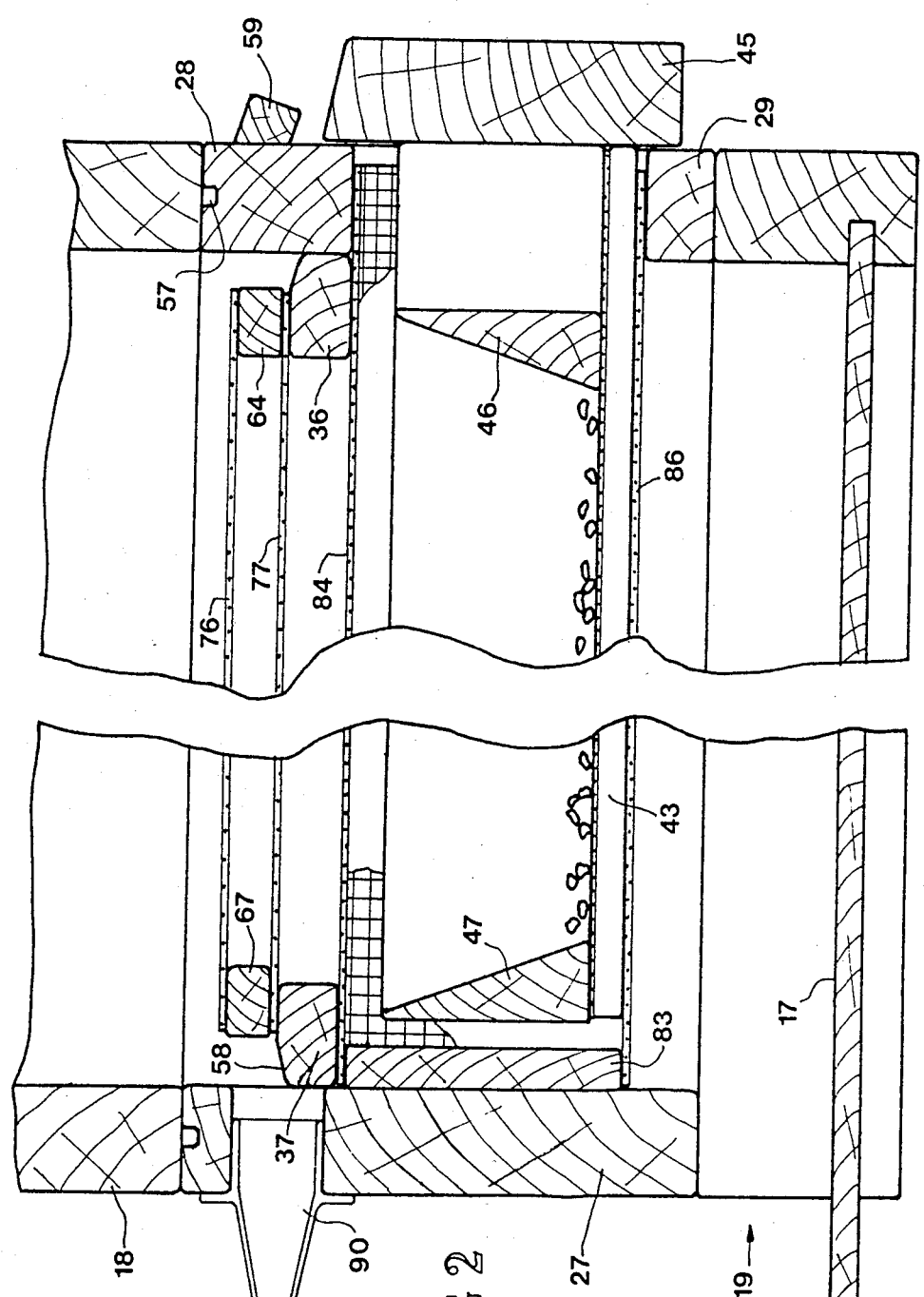
FIG. 2 is a section of line 2—2 of FIG. 1.
Figure 3:
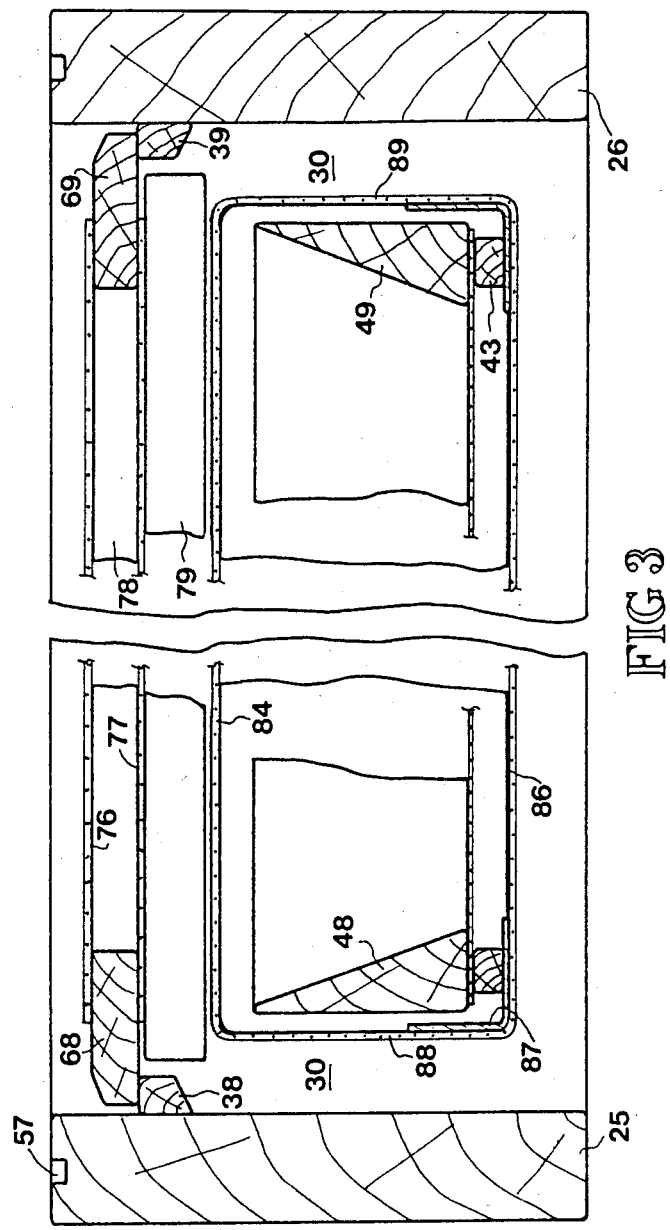
FIG. 3 is a section on line 3—3 of FIG. 1.

A beekeeper locates the pollen trap 10 of the invention between the bottom board 17 and the lowermost brood chamber 18 of a conventional beehive. Bees continue to enter and leave through their normal entranceway 19 at the front of the hive.

The pollen trap 10 comprises three separable parts: a frame 20, a pollen basket 40, and a pollen stripper 60.

The frame 20 includes two wooden side pieces 25,26 and a wooden front piece 27. ("Front", "back", etc. herein are as referred to the orientation of the hive, the entranceway 19 being at the front). The back of the frame 20 comprises a top rail 28 and a bottom rail 29. A sheath, for the pollen basket 40, comprises a sheet of galvanized steel mesh bent over and joined together to form an open ended tunnel 80. A wooden plate 83, having an outline that is complementary to the cross-section of the tunnel 80, is fixed to the front piece 27.

One end of the tunnel 80 is fitted over the plate 83 and secured to the edges of the plate 83 by staples or nails. At the other end of the tunnel 80 the roof 84 of the tunnel 80 is secured to the underside of the top rail 28 and the floor 86 of the tunnel 80 is secured to the top of the bottom rail 29, again by staples or nails.

Included in the tunnel 80 are respective lengths of angled metal 87, which extend the full length of the tunnel 80 and are located into the corners at the respective junctions of the floor 86 of the tunnel with the two sides 88,89 of the tunnel 80.

Constructed in this manner, it will be seen that the tunnel 80 of galvanized steel mesh comprises a sheath which is open only to the back of the hive and nowhere else.

It will be noted also that the sides 88,89 of the tunnel 80 are spaced from the side pieces 25,26 of the frame 20, so as to leave an access space 30 that the bees may use in making their way from the entranceway which is beneath the tunnel 80, to the chamber 18 above the tunnel 80. The minimum width of space 30 must be equal to "bee space", or about 10 mm.

The frame 20 includes ledges running all round the inside, including back 36, front 37, and side 38,39 ledges. The front ledge 37 is dimensioned so that the mesh material of the roof 84 of the tunnel 80 is trapped between the top edge of the plate 83 and the underside of the ledge 37. The side ledges 38,39 are arranged so that they do not blank off nor even constrict the bee-access space 30 at the sides of the tunnel 80.

The pollen trap 10 also includes a pollen-stripper 60 is placed on top of the ledges 36–39 and suitably secured by nails or screws. The pollen stripper 60 includes back 64, front 67, and side 68,69 members, all made of wood, to which respective sheets 76,77 of galvanized steel mesh are stapled, top and bottom. Three cross-pieces 78 are included also in the pollen stripper 60, and respective strips 79 are nailed one to each cross-piece 78, the bottom sheet 77 of mesh being thereby trapped between the strips and the cross-pieces 78. The pollen stripper 60 is thus divided into four compartments, the only access to which is through the respective meshes 76,77.

It is arranged that when the edges of the pollen stripper 60 are resting on the ledges 36–39, the bottoms of the strips 79 are almost touching the mesh that makes up the roof 84 of the tunnel 80. Thus, a bee walking across the roof 84 of the tunnel 80 encounters one of the strips 79, and may use it as a ladder to climb up to, and through, the lower mesh 77 of the pollen stripper 60. Similarly, the bee may use the cross pieces 78 as ladders to climb through the upper mesh 76 of the pollen stripper 60.

Finally, the pollen trap 10 also includes a pollen basket 40. The pollen basket 40 is dimensioned to fit inside the tunnel 80, and to be thereby isolated from direct contact with the bees. The pollen basket 40 rests on the lengths of angled metal 87, which act as runners or guides. If these lengths were not included, i.e., if the pollen basket 40 were to run directly on the mesh, then the bees might propolise through the interstices of the mesh and thereby glue pollen basket 40 to the mesh. The lengths of metal angles 87 prevent this from happening, and also ensure a smooth sliding action. Wooden runners could, of course, be provided alternatively.

The pollen basket 40 has a back 45 (i.e., the component of the pollen basket 40 that is to go at the back of the hive) which is dimensioned to blank off, and to overlap, the space defined between the top 28 and bottom 29 rails and the side pieces 25,26.

The pollen basket 40 includes back 46, front 47, and side 48,49 members, all made of wood. The side members have extensions by which they are attached to the tray-back 45. Runners 43 are secured underneath the side members 48,49. These runners have the effect of raising up the mesh floor of the basket 40 so that there is a space between the basket and the bottom 86 of the tunnel 80. If this space were not present, i.e., if the mesh floor of the basket were to rest against the bottom 86 of the tunnel, then the bees would tend to propolise the basket to the tunnel, rendering it immovable. There is a tendency for the bees to propolise the undersides of the front and back members 46,47 of the basket to the bottom 86. The runners 43 themselves are held remote from the bees by virtue of the metal angles 87. The members 46–49 are all of tapered section, so that, whilst the members have adequate strength, pollen falling at the very edges of the tray 40 is received on the sloping surface, and settles in the pollen basket 40.

It will be observed that steps have been taken to keep moisture out of the hive, and particularly to keep wind-blown rain that enters the hive from coming in contact with the pollen granules that have collected in the pollen basket tray 40. First, the top faces of two side pieces 25,26, the front piece 27, and the top rail 28 are provided each with a saw-cut groove 57. This acts as a labyrinth-seal to keep the water out. Secondly, the back 64, front 67, and side 68,69 members of the pollen stripper 60 are chamfered as at 58, to convey water away from the pollen basket. Thirdly, the back 45 of the tray 40 is sloped to keep water out, and is surmounted, when in position, by a pelmet 59 which is also sloped to keep water out. These measures are sufficient, under normal circumstances, to keep the pollen free from contamination by water.

The bees leave the hive the same way they entered. Drones however are too big to go through the meshes 76,77, so one-way exits are provided for them. These take the form of cones 90 which the bees, drones included, can walk down and fly out of, but through which they cannot return to the hive.

The pollen stripper screen 60 has the two mesh sheets 76,77 placed about 8 mm apart. The mesh of these sheets presents rectangular openings about 4.2 mm square. These are smaller than the conventional stripping screen mesh, which has openings of around 4.5 mm. The pollen trap of the invention allows the extra efficiency of stripping that is a consequence of the finer mesh, as described earlier. An alternative is to replace the upper one of the mesh sheets with perforated rigid material, metal or plastic. The perforations are holes of around 4.8 mm diameter. The bottom sheet should be of actual mesh, and should not be a perforated sheet, because pollen dislodged from the bees by the top sheet might collect on the metal between the holes of a perforated sheet.

In the invention, the mesh bottom of the pollen basket 40 occupies almost the full area of a horizontal section through the hive. Thus, ventilation is interfered with the least, the pollen is dried the quickest, and good access for the bees is provided. The pollen tends to be distributed evenly over the area of the pollen basket, as contrasted with a tendency in previous designs for the pollen to collect in local heaps.

What is claimed is:

1. Pollen trap for a beehive, comprising:
   a rectangular frame, which is dimensioned to fit as a section in a beehive, the frame having front, back, and two side members, and being open at the top and bottom;
   a pollen-stripper screen, having at least one layer of a mesh that is coarse enough that bees can pass through the mesh, yet fine enough to dislodge granules of pollen from bees passing through the mesh, the screen being fitted to the open top of the frame in such a way that bees cannot pass from within the frame to above the frame except through the mesh;
   a pollen basket for collecting the pollen granules dislodged from the bees, the pollen basket having a bottom of fine mesh through which air can circulate;
   wherein the pollen basket is enclosed in a sheath which is impervious to bees, so that bees are kept from contact with the pollen basket, the sheath being not open to the inside of the hive;
   wherein the sheath has a mouth that is open to the outside of the hive to allow the pollen basket to be inserted into the sheath and withdrawn from it;
   wherein at least the roof of the sheath over the pollen basket is of a mesh that is coarse enough that granules of pollen can fall through the mesh yet fine enough that bees cannot get through the mesh;
   and wherein a space is provided between a side of the sheath and the side piece of the frame adjacent to it, of a width that allows bees to pass through the space from below the sheath to above it.

2. Pollen trap of claim 1, wherein the outline of the mouth of the sheath is slightly larger than a cross-section of the pollen basket, and the sheath retains that outline over substantially its whole length so as to form a tunnel, the tunnel having a length substantially equal to the length of the frame.

3. Pollen trap of claim 2, wherein the sheath is a rectangular tunnel formed of mesh, closed at one end by being secured to the four edges of a rectangular plate on the front member of the frame.

4. Pollen trap of claim 3, wherein the trap is symmetrical, bee access space being provided between both sides of the tunnel and the respective side members of the frame, the access spaces running substantially the full length of the frame.

5. Pollen trap of claim 4 wherein the mesh tunnel is provided with respective metal angles at the junction between the two sides and the floor of the tunnel, and the tray slides on those angles.

6. Pollen trap of claim 1, wherein means are provided for preventing moisture from entering the pollen tray.

7. Pollen trap of claim 6, wherein all 4 sides of the frame are grooved to prevent rainwater entering the trap.

* * * * *